(12) United States Patent
Surazski et al.

(10) Patent No.: US 7,330,541 B1
(45) Date of Patent: Feb. 12, 2008

(54) AUTOMATED CONFERENCE MODERATION

(75) Inventors: Luke K. Surazski, San Jose, CA (US); Pascal H. Huart, Nice (FR)

(73) Assignee: Cisco Technology, Inc., San Jose, CA (US)

( * ) Notice: Subject to any disclaimer, the term of this patent is extended or adjusted under 35 U.S.C. 154(b) by 977 days.

(21) Appl. No.: 10/444,794

(22) Filed: May 22, 2003

(51) Int. Cl.
*H04M 3/42* (2006.01)
*H04M 1/00* (2006.01)

(52) U.S. Cl. .................. 379/202.01; 379/158

(58) Field of Classification Search .......... 379/202.01, 379/203.01, 204.01, 205.01, 206.01, 207.01, 379/93.21, 158
See application file for complete search history.

(56) References Cited

U.S. PATENT DOCUMENTS

| | | | | |
|---|---|---|---|---|
| 4,937,856 A | 6/1990 | Natarajan | ................... | 379/158 |
| 6,418,125 B1 | 7/2002 | Oran | .......................... | 370/266 |
| 2003/0198195 A1* | 10/2003 | Li | .............................. | 370/260 |

* cited by examiner

*Primary Examiner*—William J. Deane, Jr.
(74) *Attorney, Agent, or Firm*—Baker Botts L.L.P.

(57) ABSTRACT

A conferencing system provides automated conference moderation at appropriate times to suppress disorder in an on-going conference. According to particular embodiments, a conference bridge provides multi-mode speaker selection to provide automated conference moderation for a disorderly conference.

28 Claims, 2 Drawing Sheets

AUTOMATED CONFERENCE MODERATION

TECHNICAL FIELD OF THE INVENTION

The present invention relates generally to conference systems and, more particularly, to automated conference moderation.

BACKGROUND OF THE INVENTION

Conferencing technology enables three or more callers to participate in a single telephone call. This technology has become firmly entrenched as an invaluable tool in both business and personal settings. However, in some circumstances, the effectiveness of a conference can be impacted by one or more "unruly" participants. For example, when two groups of participants attempt to carry on separate conversations, the resulting conference can be unintelligible.

SUMMARY OF THE INVENTION

In accordance with the present invention, techniques for automated conference moderation are provided. According to particular embodiments, these techniques enable a conference system to detect and automatically moderate among the participants of a conference to suppress disorder in the conference.

According to a particular embodiments, a method for providing conferencing services provides a first speaker selection mode for orderly conference operations, the first speaker selection mode specifying a maximum number of active speakers, and provides a second speaker selection mode for disorderly conference operation, the second speaker selection mode specifying a maximum number of active speakers less than the maximum number of active speakers specified for the first speaker selection mode. The method establishes a conference having at least three participants, each of the participants providing an input media stream, sets a current speaker selection mode to the first speaker selection mode, and operates in the current speaker selection mode to select one or more of the input media streams as active speakers, wherein the number of selected active speakers is less than or equal to the maximum number of active speakers for the current speaker selection mode. The method detects disorderly conference operation of the conference and, in response to detecting disorderly conference operation, sets the current speaker selection mode to the second speaker selection mode.

Embodiments of the invention provide various technical advantages. These techniques can help increase productivity and usefulness of conference calls. For example, an automated conference moderation feature may provide for more orderly and productive conferences by detecting and suppressing disorder within a conference.

According to particular embodiments, the automated conference moderation feature automatically detects disorderly conferences and, in response, implements measures to return the conference to order. These various automated conference moderation features can provide effective functionality while requiring minimal user intervention and interfacing. For example, an appropriately enabled conference bridge can detect a disorderly conference and automatically implement measures to suppress the disorder in the conference while requiring little or no intervention by a conference moderator. Therefore, these techniques can provide powerful conferencing features without requiring advanced interfaces for use by conference moderators.

Other technical advantages of the present invention will be readily apparent to one skilled in the art from the following figures, descriptions and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
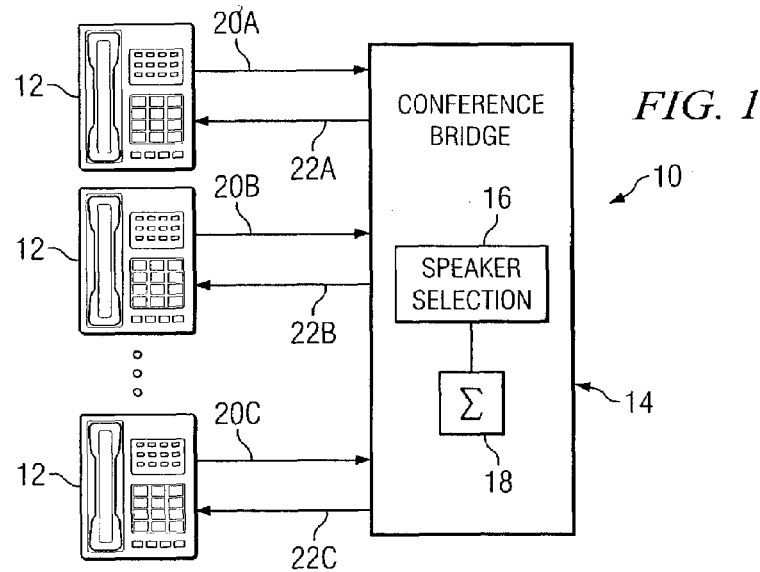
FIG. 1 illustrates a communication system that includes a conference bridge that operates in accordance with particular embodiments of the present invention.

FIG. 1 illustrates a communication system, indicated generally at 10, that includes multiple communication devices 12 each linked to a conference bridge 14. In general, conference bridge 14 provides conferencing services to enable media communication sessions between multiple devices 12. During these communication sessions, conference bridge 14 may provide automated conference moderation. For example, conference bridge 14 may provide automated conference moderation to suppress disorderly participants of a conference and attempt to return the conference to order. To provide automated conference moderation, conference bridge 14 may use various algorithms to limit participants ability to disrupt the conference, such as algorithms that reduce the number of active speakers during a conference and/or limit a participant's ability to interrupt current speakers.

Devices 12 each represent communications equipment, including hardware and any appropriate controlling logic, for participating in communication sessions. For example, devices 12 may include traditional telephones, mobile phones, packet based phones, video phones, specially enabled computers, or any other appropriate communication device. In the embodiment illustrated, each device 12 links to conference bridge 14 to participate in conferences supported by conference bridge 14. While not explicitly shown, system 10 contemplates each device 12 connecting with conference bridge 14 using any suitable protocols and intermediary networks.

Within system 10, conference bridge 14 provides conferencing services to one or more devices 12. Conference bridge 14 represents any suitable combination and arrangement of hardware, including any appropriate controlling logic, that can facilitate voice and/or media communication sessions between three or more devices 12. While illustrated as a separate component of system 10, it should be apparent that the illustrated diagram is not necessarily literal, and the functions of conference bridge 14 may be incorporated within or distributed among any suitable elements. Thus, for example, the functions of conference bridge 14 may be provided within selected devices 12.

In the embodiment illustrated, conference bridge 14 includes a speaker selection module 16 and a media summation module 18. Speaker selection module 16 enables conference bridge 14 to select active speakers from multiple incoming media streams. That is, speaker selection module 16 selects one or more active speakers from among any number of active incoming media streams. To select the active speakers, speaker selection module 16 may use any suitable algorithm that considers any appropriate criteria. For example, the speaker selection algorithm may provide for the selection of four active speakers from among all media streams that are currently providing active input.

Summation module 18 receives the active media streams selected as active speakers within speaker selection module 16 and sums these media streams into one or more conference media streams. Summation module 18 may create multiple conference media streams and tailor the streams to individuals or groups of participants. For example, for each active speaker in a conference, summation module 18 may generate a separate conference media stream that does not include input from the active speaker. This prevents a speaker from hearing "feedback" of his own input. Conference bridge 14 may then supply these conference media streams to the participants of a conference. Thus during a conference, conference bridge 14 receives multiple input media streams 20 from any number of devices 12. Speaker selection module 16 selects one or more active media streams from among these input media streams 20 as active speakers. Summation module 18 combines the selected active media streams into one or more conference media streams 22 and provides appropriate conference media streams 22 to participating devices 12.

To provide automated conference moderation, speaker selection module 16 provides multiple modes of operation. In a "normal" mode of operation, speaker selection module 16 attempts to provide a typical conference environment. For example, speaker selection module 16 may employ traditional selection algorithms to provide a conference environment in which speakers can join in and contribute to the conference virtually at will. However, during operation in normal mode, one or more participants can disrupt the conference through actions such as constant interjections or carrying on separate conversations. To respond to disruptions, speaker selection module 16 provides a "disorderly" mode of operation. When operating in disorderly mode, speaker selection module 16 suppresses the ability of conference participants to disrupt the on-going conference.

Regardless of the current mode of operation, speaker selection module 16 may use any suitable algorithms and criteria to determine the currently active speakers. According to particular embodiments, speaker selection module 16 may select active speakers based upon the current number of active speakers and the short term and long term energy averages for each of the conference participants. Thus, during operation, speaker selection module 16 selects up to the maximum number of active speakers and enables other conference participants to become active speakers when certain criteria are met. For example, consider a conference participant attempting to add to a conversation. Speaker selection module 16 may select the new speaker as an active speaker if the current number of active speakers is less than a total allowable number of active speakers. Thus, if speaker selection module 16 permits a maximum number of four active speakers, a new speaker will be allowed to break into a conversation so long as speaker selection module 16 has currently selected three or fewer active speakers.

If speaker selection module 16 has currently selected the maximum number of allowable active speakers, a new speaker may still be able to break in given certain circumstances. For example, speaker selection module 16 may replace a current active speaker with a new speaker based on comparisons between short term and/or long term energy averages. Short-term energy, which may be measured for any or all participants in a conference, measures the amount of energy recently received from a conference participant. According to particular embodiments, speaker selection module 16 measures short-term energy by averaging energy over a time frame ranging from approximately ten to fifty milliseconds. Long-term energy, like short-term energy, may be measured for any or all participants of a conference. However, long-term energy measures the amount of energy received from a particular participant for a period of time longer than the short-term energy measurement. According to particular embodiments, speaker selection module 16 may measure long-term energy by averaging energy over a time frame ranging between two hundred and six hundred milliseconds. Thus, for example, the short-term energy measurement for a particular participant could indicate the average energy received in the last ten milliseconds, while the long-term energy measurement could indicate the average energy received in the last two-hundred milliseconds. However, while specific ranges and values are given above, these numbers are merely illustrative, and system 10 contemplates speaker selection module 16 using any appropriate time frames for determining short-term and long-term energy measurements.

As previously noted, when speaker selection module 16 has currently selected the maximum number of active speakers, a new speaker may "break in" as an active speaker based upon short-term and long-term energy measurements. If the short-term energy average of a candidate stream is greater than that of an active speaker, then the new candidate stream may be allowed to break in. That is, the candidate stream may take the place of one of the current active speaker streams and begin contributing to the conference media stream. This permits strong, short interjections to contribute to the conference media stream. If the long-term energy average of a candidate media stream is greater than that of an active speaker, then speaker selection module 16 may permit the candidate media stream to break in. That is, speaker selection module 16 may replace one of the currently active speakers with the candidate media stream. This permits a speaker to break in and provide continuing input to the conference media stream.

In addition to the criteria discussed above for use by speaker selection module 16, system 10 contemplates speaker selection module 16 using any other appropriate techniques for determining currently active speakers. For example, speaker selection module 16 may also include a priority-based selection criterion. Thus, for example, speaker selection module 16 may always permit a high priority speaker to break into the conference media stream.

The techniques described above provide for effective speaker selection during a normal conference. However, as should be apparent, these techniques can permit conference participants to disrupt an on-going conference. For example, if speaker selection module 16 permits four active speakers, those four conference participants may simultaneously carry on two different conversations. Also, one conference participant can frequently disrupt the on-going conference with strong short interjections. Additionally, a conference participant can disrupt an on-going conference by consistently speaking over other conference participants. To deal with these and other disruptions of an orderly conference, speaker selection module 16 may provide automated conference moderation by switching into disorderly mode.

When switched into disorderly mode, speaker selection module 16 modifies the speaker selection algorithm. In modifying the speaker selection algorithm, speaker selection module 16 may use generic and/or targeted responses to conference disruptions. Generic responses attempt to apply common changes to the speaker selection algorithm regardless of the type of disruption occurring in the conference. Targeted responses modify the speaker selection algorithm based upon the particular type of disruption occurring in the conference. For example, to apply a generic response, speaker selection module 16 may reduce the maximum number of active speakers upon detecting a disorderly conference. This response can effectively reduce disorder across a wide array of disruptions. As an example of a targeted response, consider a conference being disrupted by a large number of short-term interjections. In response, speaker selection module 16 may suspend the short term energy selection criterion. This prevents these short interjections from breaking into the conference media stream.

Upon detecting a disorderly conference, speaker selection module 16 modifies the speaker selection algorithm using any appropriate generic and/or targeted responses. According to particular embodiments, speaker selection module 16 modifies the speaker selection algorithm to permit only a single active speaker and implements a priority-based interruption scheme. This provides for instant control over a disorderly conference. However, while this scheme provides for strong control over a disorderly conference, less severe schemes may be imposed. Moreover, speaker selection module 16 may use a stepwise approach to a disorderly conference, in which slightly more controlling algorithms are applied until the conference becomes orderly. For example, speaker selection module 16 may slowly reduce the maximum number of active speakers over time so long as a conference remains disorderly.

According to particular embodiments, speaker selection module 16 may use a fluctuating priority scheme in its disorderly mode. In a fluctuating priority scheme, the priority of various conference participants can fluctuate according to actions during the conference. One particular fluctuating priority scheme assigns a highest priority to a conference moderator and enables the other conference participants to fluctuate among priorities below the conference moderator. For example, upon entering disorderly mode, speaker selection module 16 may assign the conference moderator a level six priority, while assigning all other conference participants a level five priority. As the conference proceeds, speaker selection module 16 selects the current active speaker from the highest priority active input stream. Thus, the conference moderator will always break in as the active speaker over any other conference participant.

If the conference moderator interrupts a speaker, speaker selection module 16 may reduce the "interrupted" speaker's priority. Thus, each time a speaker is interrupted by the conference moderator, that speaker's ability to regain an active speaking position is reduced. For example, if the conference moderator, at priority six, interrupts a priority five speaker, the priority five speaker may be reduced to a priority four speaker. All other priority five speakers will then have priority over the newly-minted priority four speaker. Over time, speaker selection module 16 may restore priority levels to interrupted speakers. Thus, for example, after twenty seconds at priority four, speaker selection module 16 may automatically increase the speaker back to priority five. However, while the preceding examples illustrate a particular technique for a fluctuating priority scheme, system 10 contemplates speaker selection module 16 using any suitable techniques for implementing priority schemes and for altering a current speaker selection algorithm to impose order into a disorderly conference.

To switch between normal and disorderly modes of operation, speaker selection module 16 may use any suitable techniques. According to particular embodiments speaker selection module 16 uses manual and/or automatic techniques for detecting a disorderly conference and switching between normal and disorderly modes. For manual techniques, speaker selection module 16 may rely upon a conference participant, such as a conference moderator, to request a switch between normal and disorderly modes. Thus, for example, a conference moderator may provide a dual-tone multi-frequency (DTMF) indicator, a soft-key indication, a voice request, or other appropriate indicator to switch between normal and disorderly modes.

Speaker selection module 16 may alternatively or additionally support automatic detection of disorderly conference. According to particular embodiments, speaker selection module 16 attempts to automatically differentiate between normal and disorderly conferences by analyzing the input media streams from each conference participant. For example, an orderly conference can often be characterized by a single person speaking with occasional interjections from other participants. Speaker selection module 16 may use various techniques to identify a conference that strays from this typical operation.

System 10 contemplates speaker selection module 16 using any suitable information and criteria for differentiating between orderly and disorderly conferences. According to particular embodiments, speaker selection module 16 monitors for relatively rapid shifting in the active speakers while the number of active speakers is at the maximum allowed. Speaker selection module 16 may additionally monitor for two or more active input streams that remain active for greater that some threshold time period, such as two seconds. If this condition occurs, the conference participants may be attempting to carry on two simultaneous discussions. By monitoring these and/or other criteria, speaker selection module 16 can automatically detect whether or not a conference is in a disorderly state. With this information, speaker selection module 16 can shift between normal and disorderly modes.

Figure 2:
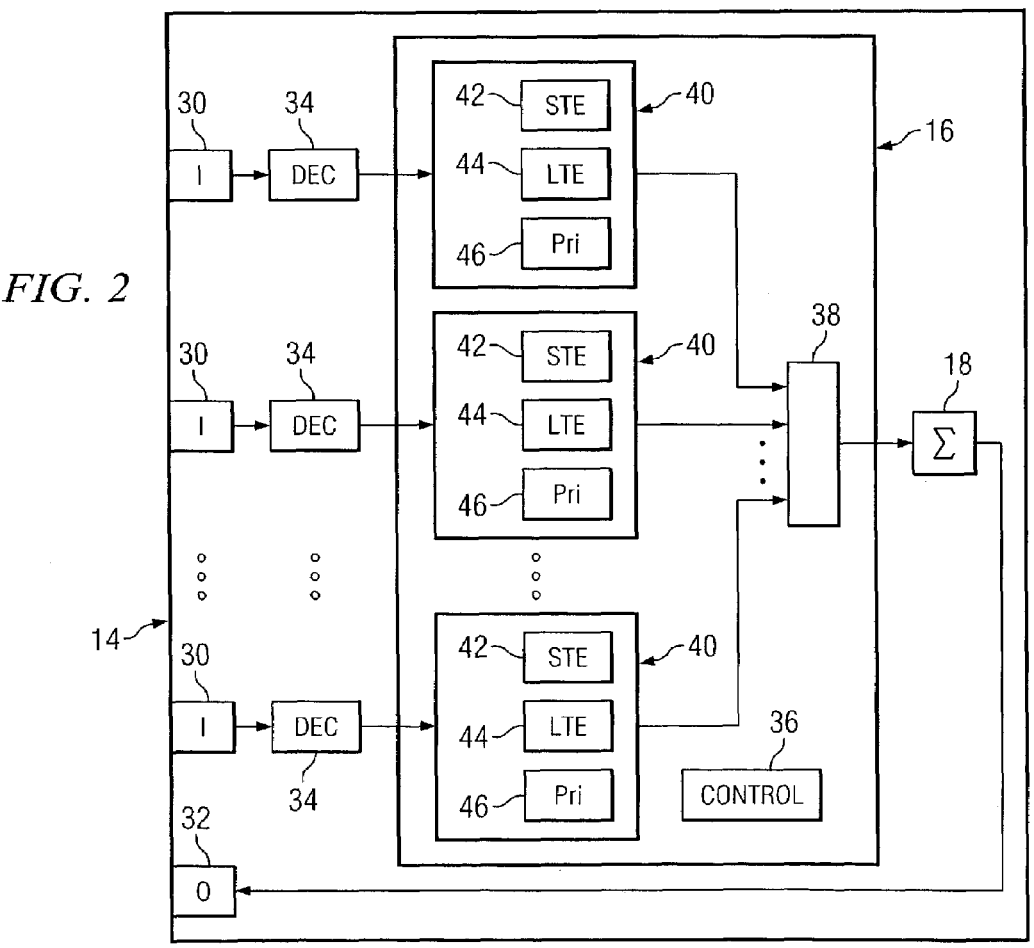
FIG. 2 is a block diagram illustrating in greater detail functional elements of an exemplary conference bridge from the system.

FIG. 2 is a block diagram illustrating exemplary functional elements for conference bridge 16. In the embodiment illustrated, conference bridge 16 includes speaker selection module 16 and summation module 18. In addition, conference bridge 16 includes multiple inputs 30 and an output 32. For each input 30, conference bridge 14 also includes a decoder 34. During operation, conference bridge 16 receives multiple input media streams using inputs 30 and decodes these input media streams using decoders 34. Speaker selection module 16 then selects active speakers for the conference from among these input media streams. Speaker selection module 16 supplies the media streams from these selected active speakers to summation module 18. Summation module 16 combines the selected media streams into one or more conference media streams and supplies these streams back to the conference participants using output 32. During operation, speaker selection module 16 provides for suppression of disorder in a conference at appropriate times.

In the embodiment illustrated, speaker selection module 16 includes a control module 36, a multiplexer 38, and one or more input monitoring modules 40. Control module 36 provides for control of the operation of speaker selection module 16. For example, using information provided by monitoring modules 40, control module 36 may select one or more active speaker media streams from among the input media stream. Control module 36 may then set multiplexer 38 to select the appropriate media streams. Thus, multiplexer 38 provides for selecting one or more active media streams based upon commands received from control module 36.

Each monitoring module 40 enables speaker selection module 16 to monitor an input media stream during a conference. According to particular embodiments, monitoring module 40 measures characteristics, such as a short-term energy average and a long-term energy average, for an input media stream. Thus, in the embodiment illustrated, each monitor module 40 maintains a short term energy measurement 42 and a long-term energy measurement 44 for an associated input media stream. In addition to maintaining this information, each monitoring module 40 may also maintain other information regarding an input media stream. For example, monitoring module 40 may also maintain a priority 46 for its associated media stream. Control module 36 may then use the stored priorities 46 for each input media stream during speaker selection. For example, control module 36 may implement a fluctuating priority scheme, such as the one described above, to select active speakers when in disorderly mode.

During operation, conference bridge 14 establishes connections with one or more conference participants using inputs 30. While the conference is in progress, conference bridge 14 may receive input media streams from the participants of the conference. When appropriate, conference bridge 14 decodes these input media streams using decoders 34. Thus, for example, if supporting packet-based communications, conference bridge 14 may use decoders 34 to convert the packet-based communications into audio or other appropriate media streams. Speaker selection module 16 then receives these media streams.

Within speaker selection module 16, monitoring modules 40 provide for analysis of each of the received input media streams. Control module 36 uses this analysis, in combination with a current speaker selection algorithm, to determine active speakers from among the input media streams. Based upon the selected active speakers, control module 36 commands multiplexer 38 to select those appropriate media streams.

As previously discussed, particular embodiments of speaker selection module 16 provide for multiple modes of operation. Therefore, control module 36 may use different speaker selection algorithms based upon the analysis of input media streams performed by monitoring modules 40. During periods of orderly conference participation, control module 36 may apply a normal speaker selection mode. As previously discussed, this normal mode attempts to provide a typical conference flow with minimal restrictions among participants. In times of conference disorder, control module 36 may apply a different speaker selection algorithm tailored to suppress disorder in the conference. As an initial response to detecting a disorderly conference, control module 36 may, for example, reduce the number of active speakers currently allowed. Alternatively or in addition, control module 36 may implement additional changes to the speaker selection algorithm, such as restrictions upon speaker changes and priority-based or fluctuating priority-based speaker selection.

As previously discussed, control module 36 may use any suitable techniques for switching between normal and disorderly modes of operation. Therefore, control module 36 may use automatic and/or manual techniques for switching between these modes. For example, control module 36 may monitor the input stream from a designated conference moderator to determine if the conference moderator has requested a switch between modes. Alternatively or in addition, control module 36 may monitor analysis of the input streams to identify characteristics of a disorderly conference. With this information, control module 36 can determine when to switch between modes of operation.

Thus, for example, when operating in orderly mode, control module 36 may monitor the characteristics of input media streams to determine whether the conference has become disorderly, indicating that a shift into disorderly operational mode is appropriate. Similarly, when operating in disorderly mode, control module 36 may monitor the characteristics of input streams to determine whether a shift back to normal operational mode is appropriate.

While the illustration and the preceding description focus on a particular embodiment of conference bridge 14 that includes specific elements providing particular functions, system 10 contemplates conference bridge 14 having any suitable combination and arrangement of elements providing functions to support media conferencing with multi-mode speaker selection. Thus, the functionalities performed by the particular elements illustrated may be separated or combined as appropriate. For example, while illustrated as including multiple monitoring modules 40, the functionalities of these elements may be provided by a single module. Similarly, while shown as including multiple inputs 30, conference bridge 14 may use any suitable technology and techniques for interfacing with conference participants. Thus, for example, conference bridge 14 may include one or more logical ports for communicating packets with devices 12. Additionally, while specific functional elements are shown within conference bridge 14, system 10 contemplates providing some or all of these functionalities using logic, such as software, encoded in media.

Figure 3:
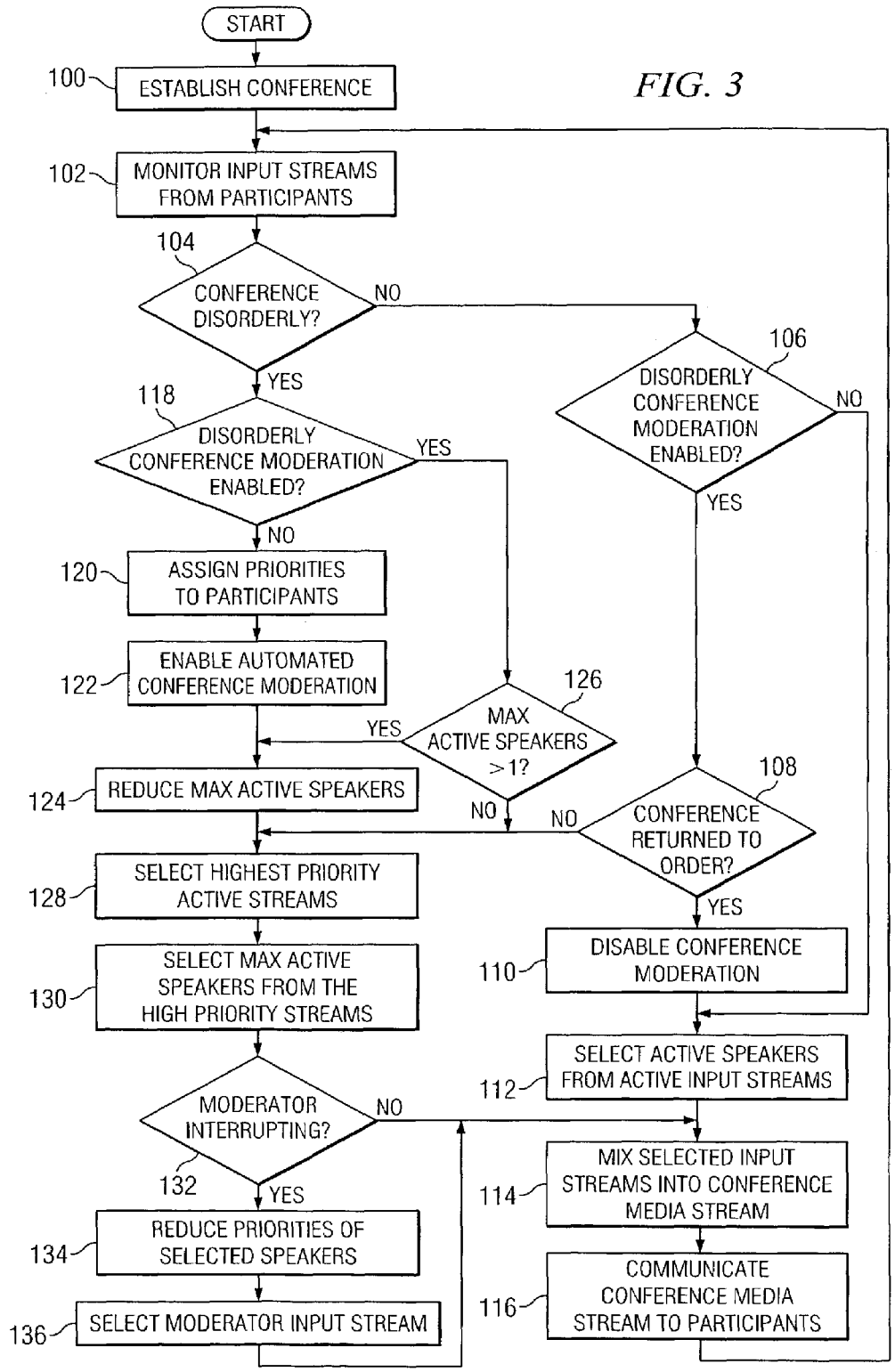
FIG. 3 is a flowchart illustrating a method for providing automated conference moderation.

FIG. 3 is a flowchart illustrating a method for hosting a conference and providing multi-mode speaker selection to enable automated conference moderation. Conference bridge 14 establishes a conference at step 100. For example, conference bridge 14 may connect with one or more devices 12 to enable communications of media with these participants. During the conference, conference bridge 14 monitors input streams from each of the conference participants at step 102. For example, using monitoring modules 40, conference bridge 14 may analyze various characteristics of input streams received from conference participants. Conference bridge determines whether the conference is disorderly at step 104. For example, control module 36 may access the information within monitoring modules 40 to determine whether the characteristics of the input streams indicate disorder within the conference.

If conference bridge 14 determines that the conference is not disorderly at step 104, conference bridge 14 determines whether disorderly conference moderation is enabled at step 106. This step may, for example, determine the current mode of operation within speaker selection module 16. If disorderly conference moderation is not enabled, speaker selection module 16 acts in normal mode. In this circumstance, speaker selection module 16 selects active speakers from active input streams at step 112. For example, speaker selection module 16 may identify those input streams with active incoming media and select up to the maximum number of active speakers using the current speaker selection algorithm. Conference bridge 14 then mixes the selected input streams into one or more conference media streams at step 114 and communicates the conference media streams to participants at step 116.

If conference bridge 14 determines that the conference is not disorderly at step 104, yet determines at step 106 that disorderly conference moderation is enabled, conference bridge 14 then determines whether the conference has returned to order at step 108. With this determination, conference bridge 14 attempts to prevent rapid switching between normal and disorderly modes by ensuring that the conference has not only briefly returned to order. Thus, for example, conference bridge 14 may determine whether the conference has remained orderly for greater than some threshold period of time. If so, conference bridge 14 disables automated conference moderation at step 110. In this step, conference bridge 14 can, for example, switch from disorderly mode to normal mode of operation. Conference bridge 14 then selects active speakers at step 112 using the enabled speaker selection algorithm, mixes the selected the input streams at step 114, and communicates the conference media streams to participants at step 116.

If the conference has not returned to order at step 108, conference bridge 14 treats the conference as remaining in disorder. Thus, in this circumstance, conference bridge 14 uses a disorderly speaker selection algorithm to select active speakers. In the embodiment illustrated, this includes a fluctuating priority-based scheme detailed at steps 128 to 136. These steps are described in greater detail below with respect to disorderly conference operation.

As previously discussed, conference bridge 14 determines whether the conference is disorderly at step 104. If the conference is disorderly, conference bridge 14 determines whether disorderly conference moderation is enabled at step 118. As previously noted, this may involve determining the current mode of operation within speaker selection module 16. If disorderly conference moderation is not enabled, conference bridge 14 assigns priorities to participants at step 120 and enables automated conference moderation at step 122. In addition, conference bridge 14 reduces the max number of active speakers permitted at step 124. According to particular embodiments, conference bridge 14 may immediately set the maximum number of active speakers to one. Alternatively, conference bridge 14 may implement a stepwise reduction in the maximum number of active speakers to gradually combat a disorderly conference. The flowchart illustrated provides for the later type of operation. Thus, if a conference remains disorderly while disorderly conference moderation is enabled, conference bridge 14 determines whether the maximum number of active speakers permitted is greater than one at step 126. If so, conference bridge 14 reduces the maximum number of active speakers permitted at step 124.

In the method illustrated by this flowchart, conference bridge 14 implements a fluctuating priority speaker selection scheme. Thus, conference bridge 14 selects the highest priority active input streams at step 128 and selects the maximum number of active speakers from these high priority streams at step 130. For example, if multiple participants with a common priority are currently speaking, conference bridge 14 will select all of these active streams at step 128 and then use any appropriate selection algorithm for selecting active speakers from among these active common priority streams at step 130.

Conference bridge 14 determines whether a conference moderator is interrupting at step 132. If so, conference bridge 14 reduces the priorities of the selected speakers at step 134. Thus, for example, when a speaker is interrupted by a conference moderator, the priority of that speaker is reduced, thus limiting that participant's ability to further contribute to the conference. As previously noted, conference bridge 14 may increase or restore that participant's priority later on during the conference. This can provide a short-term penalization for speakers that are interrupted by a conference moderator.

When the conference moderator speaks, conference bridge 14 selects the moderator input stream at step 136. If the moderator is not speaking, conference bridge 14 maintains the selected speaker streams from step 130. Conference bridge 14 mixes the selected input streams into one or more of the conference media streams at step 114 and communicates the conference media streams to conference participants at step 116.

Thus, the illustrated flowchart provides an exemplary method for multi-mode conference speaker selection to enable automated conference moderation. This enables conference bridge 14 to suppress disorder within a conference using modifications to a speaker selection algorithm. However, while the preceding flowchart and accompanying description illustrate a particular method for conference bridge 14 to provide automated conference moderation, this provides only an exemplary method of operation. System 10 contemplates conference bridge 14 using any appropriate techniques to provide automated conference moderation. Thus, many of the steps in this flowchart may take place simultaneously and/or in different orders than as shown. In addition, conference bridge 14 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for providing conferencing services comprising:
   establishing a conference having at least three participants, each of the participants providing an input media stream;
   providing a first speaker selection mode for orderly conference operation, the first speaker selection mode specifying a maximum number of active speakers;
   providing a second speaker selection mode for disorderly conference operation, the second speaker selection mode specifying a maximum number of active speakers less than the maximum number of active speakers specified for the first speaker selection mode;
   setting a current speaker selection mode to the first speaker selection mode;
   operating in the current speaker selection mode to select one or more of the input media streams as active speakers, wherein the number of selected active speakers is less than or equal to the maximum number of active speakers for the current speaker selection mode;
   detecting disorderly conference operation of the conference; and
   in response to detecting disorderly conference operation, setting the current speaker selection mode to the second speaker selection mode.

2. The method of claim 1, further comprising, while the current speaker selection mode is the first speaker selection mode:
   measuring long term energy for each of the input media streams;
   measuring short term energy for each of the input media streams;

comparing the short term energy measurements and the long term energy measurements of the selected input media streams to the other input media streams; and changing the selected input media streams based upon the comparison.

3. The method of claim 2, further comprising, while the current speaker selection mode is the second speaker selection mode, preventing changes in the selected input media streams based upon the comparison.

4. The method of claim 1, further comprising, while the current speaker selection mode is the second speaker selection mode:

maintaining a priority for each of the participants; and selecting one or more of the input media streams as active speakers based upon the priorities of each of the input media streams providing input.

5. The method of claim 4, wherein one of the participants is a conference moderator, the method further comprising:

detecting input in the input media stream from the conference moderator;

determining that at least one other participant is currently providing input in the input media stream from the other participant; and lowering the priority of the other participant.

6. The method of claim 1, wherein detecting disorderly conference operation comprises:

monitoring the input media streams from the participants; and determining that the input media streams match predetermined characteristics of a disorderly conference.

7. The method of claim 1, wherein detecting disorderly conference operation comprises receiving an indication from one of the participants requesting a switch to the second speaker selection mode.

8. The method of claim 1, further comprising, while the current speaker selection mode is the second speaker selection mode:

monitoring all of the input media streams;

determining that the conference has returned to orderly conference operation based upon the monitoring; and in response to determining that the conference has returned to orderly conference operation, setting the current speaker selection mode to the first speaker selection mode.

9. The method of claim 1, further comprising:

combining the selected input media streams into at least one conference media stream;

communicating the conference media stream to selected ones of the participants.

10. Logic for providing conferencing services, the logic encoded in media and operable when executed to perform the steps of:

establishing a conference having at least three participants, each of the participants providing an input media stream;

providing a first speaker selection mode for orderly conference operation, the first speaker selection mode specifying a maximum number of active speakers;

providing a second speaker selection mode for disorderly conference operation, the second speaker selection mode specifying a maximum number of active speakers less than the maximum number of active speakers specified for the first speaker selection mode;

setting a current speaker selection mode to the first speaker selection mode;

operating in the current speaker selection mode to select one or more of the input media streams as active speakers, wherein the number of selected active speakers is less than or equal to the maximum number of active speakers for the current speaker selection mode;

detecting disorderly conference operation of the conference; and in response to detecting disorderly conference operation, setting the current speaker selection mode to the second speaker selection mode.

11. The logic of claim 10, further operable, while the current speaker selection mode is the first speaker selection mode, to perform the steps of:

measuring long term energy for each of the input media streams;

measuring short term energy for each of the input media streams;

comparing the short term energy measurements and the long term energy measurements of the selected input media streams to the other input media streams; and changing the selected input media streams based upon the comparison.

12. The logic of claim 11, further operable, while the current speaker selection mode is the second speaker selection mode, to prevent changes in the selected input media streams based upon the comparison.

13. The logic of claim 10, further operable, while the current speaker selection mode is the second speaker selection mode, to perform the steps of:

maintaining a priority for each of the participants; and selecting one or more of the input media streams as active speakers based upon the priorities of each of the input media streams providing input.

14. The logic of claim 13, wherein one of the participants is a conference moderator, the logic further operable to perform the steps of:

detecting input in the input media stream from the conference moderator;

determining that at least one other participant is currently providing input in the input media stream from the other participant; and lowering the priority of the other participant.

15. The logic of claim 10, further operable to detect disorderly conference operation by:

monitoring the input media streams from the participants; and determining that the input media streams match predetermined characteristics of a disorderly conference.

16. The logic of claim 10, further operable to detect disorderly conference operation by receiving an indication from one of the participants requesting a switch to the second speaker selection mode.

17. The logic of claim 10, further operable, while the current speaker selection mode is the second speaker selection mode, to perform the steps of:

monitoring all of the input media streams;

determining that the conference has returned to orderly conference operation based upon the monitoring; and in response to determining that the conference has returned to orderly conference operation, setting the current speaker selection mode to the first speaker selection mode.

18. The logic of claim 10, further operable to perform the steps of:

combining the selected input media streams into at least one conference media stream;

communicating the conference media stream to selected ones of the participants.

19. A conferencing apparatus comprising:
- an interface operable to establish a conference having at least three participants and to receive an input media stream from each of the participants;
- a speaker selection module operable to operate in a current speaker selection mode, which is one of a first speaker selection mode for orderly conference operation, the first speaker selection mode specifying a maximum number of active speakers, and a second speaker selection mode for disorderly conference operation, the second speaker selection mode specifying a maximum number of active speakers less than the maximum number of active speakers specified for the first speaker selection mode, the speaker selection module operating in the current speaker selection mode to select one or more of the input media streams as active speakers, wherein the number of selected active speakers is less than or equal to the maximum number of active speakers for the current speaker selection mode; and
- a controller operable to set the current speaker selection mode to the first speaker selection mode, to detect disorderly conference operation of the conference, and in response to detecting disorderly conference operation, to set the current speaker selection mode to the second speaker selection mode.

20. The conferencing apparatus of claim 19, wherein the speaker selection module is further operable, while the current speaker selection mode is the first speaker selection mode, to:
- measure long term energy for each of the input media streams;
- measure short term energy for each of the input media streams;
- compare the short term energy measurements and the long term energy measurements of the selected input media streams to the other input media streams; and
- change the selected input media streams based upon the comparison.

21. The conferencing apparatus of claim 20, wherein the speaker selection module is further operable, while the current speaker selection mode is the second speaker selection mode, to prevent changes in the selected input media streams based upon the comparison.

22. The conferencing apparatus of claim 19, wherein the speaker selection module is further operable, while the current speaker selection mode is the second speaker selection mode, to:
- maintain a priority for each of the participants; and
- select one or more of the input media streams as active speakers based upon the priorities of each of the input media streams providing input.

23. The conferencing apparatus of claim 22, wherein one of the participants is a conference moderator, the speaker selection module further operable to:
- detect input in the input media stream from the conference moderator;
- determine that at least one other participant is currently providing input in the input media stream from the other participant; and
- lower the priority of the other participant.

24. The conferencing apparatus of claim 19, wherein the controller is operable to detect disorderly conference operation by:
- monitoring the input media streams from the participants; and
- determining that the input media streams match predetermined characteristics of a disorderly conference.

25. The conferencing apparatus of claim 19, wherein the controller is operable to detect disorderly conference operation by receiving an indication from one of the participants requesting a switch to the second speaker selection mode.

26. The conferencing apparatus of claim 19, wherein the controller is further operable, while the current speaker selection mode is the second speaker selection mode, to:
- monitor all of the input media streams;
- determine that the conference has returned to orderly conference operation based upon the monitoring; and
- in response to determining that the conference has returned to orderly conference operation, set the current speaker selection mode to the first speaker selection mode.

27. The conferencing apparatus of claim 19, further comprising:
- a media summation module operable to combine the selected input media streams into at least one conference media stream; and
- the interface operable to communicate the conference media stream to selected ones of the participants.

28. A conferencing apparatus comprising:
- means for establishing a conference having at least three participants, each of the participants providing an input media stream;
- means for providing a first speaker selection mode for orderly conference operation, the first speaker selection mode specifying a maximum number of active speakers;
- means for providing a second speaker selection mode for disorderly conference operation, the second speaker selection mode specifying a maximum number of active speakers less than the maximum number of active speakers specified for the first speaker selection mode;
- means for setting a current speaker selection mode to the first speaker selection mode;
- means for operating in the current speaker selection mode to select one or more of the input media streams as active speakers, wherein the number of selected active speakers is less than or equal to the maximum number of active speakers for the current speaker selection mode;
- means for detecting disorderly conference operation of the conference; and
- means for, in response to detecting disorderly conference operation, setting the current speaker selection mode to the second speaker selection mode.

* * * * *